Inventors:
Ralph O. Eis;
Charles F. Howard,
by James R Campbell
Their Attorney.

United States Patent Office 3,075,107
Patented Jan. 22, 1963

3,075,107
CANNED MOTOR
Ralph O. Eis, Schenectady, and Charles F. Howard, Scotia, N.Y., assignors to General Electric Company, a corporation of New York
Filed Dec. 29, 1958, Ser. No. 783,392
5 Claims. (Cl. 310—64)

The invention described herein relates to dynamoelectric machines and more particularly to an improved arrangement for transferring heat from coil end turns in canned motors.

Canned motors are now finding particular utility in industries requiring the pumping of fluids under high pressure and relatively high temperature. The canned motor utilized in carrying out this kind of operation, consists of a conventional squirrel cage motor, but its uniqueness resides in the placing of cylindrical cans in the bore of the stator core and on the rotor peripheral surface to permit circulation of a coolant through the gap formed therebetween. The stator can overhangs the magnetic core and is supported by rigid structural members which coact with an outer frame to provide a dead air space for housing the coil end turns. In the usual construction, a pump is directly connected with the motor for circulating a liquid under high pressure in an external system, and in order to eliminate a differential in pressure between that prevailing in the system and the coolant circulated through the gap, the pump pressure is reflected therein through small openings located in a housing adjacent the rotor shaft. Since the machine losses are relatively high because the electrodynamic cooperating parts are confined in dead air spaces, positive heat transfer means must be resorted to for conveying the heat to areas of lesser temperature.

Various designs have been employed to attain this objective and although acceptable machine performance is achieved, there are several important drawbacks to the prior constructions and one of the objects of this invention is to eliminate or minimize such disadvantages. Known heat transfer arrangements in canned motors generally consist of copper fins positioned between the coil end turns, but firmly attached thereto by insulating tape, which in turn is covered by a metallic foil. A wire banding has its inner peripheral surface placed in contact with the foil while its outer surface engages the frame for the machine, so that in operation, heat from the end turns is transmitted through these parts to an area of lower temperature. This contruction brings ground potential in close proximity to the insulated high voltage coils in the stator, thus minimizing the electrical protection offered the machine. The copper strips usually are installed after the coils are placed in position so the task of establishing good thermal contact between the strips and coils is not only time consuming but difficult. Also, the outer surfaces of the end turns which lie in a cylindrical plane are not equidistant from the center of the shaft and therefore form an irregular contour such that the preformed strips must be distorted when taped to the end turns thus requiring maximum hand work by operators involving a high degree of skill and high initial manufacturing costs.

Other constructions consist of completely potting or enclosing the end turns in a resinous material which may or may not contain heat conductive elements, such as copper shot. A primary disadvantage inherent in completely enclosing the end turns in this manner is that when the resinous material is cured and sets, it becomes very hard and rigid thus making its removal and subsequent coil replacement difficult and expensive. The resin when hardened is not a good heat conductive material and if the filler material is not properly selected, the complete mass is subject to cracking, especially when it joins the stator core, thus establishing creepage paths between the coil and the iron of the stator core. Also, during operation, the adverse effects caused by thermal cycling and mechanical stresses established in the potting compound may cause damage to the ground insulation on the end turns. In view of the above, it is evident that the need exists for an improved arrangement for transferring heat from canned motor end turns.

The primary object of our invention therefore to provide a construction for dissipating heat at a maximum rate from coil end turns to permit increased power output from the motor without compromising the dielectric reliability of the end turn insulation system.

Another object of our invention is to provide a relatively inexpensive but effective construction for transferring heat from coil end turns while still making them available for maintenance and repair.

In carrying out our invention, we improve the heat transfer characteristics of end turns in canned motors by enclosing a major portion of the end turn surfaces in a potting compound of magnesium oxide and a thermosetting resin. When the compound is applied and set by curing, it displays a smooth peripheral surface especially adapted for receiving a chill ring comprising a plurality of layers of copper wire having its outer peripheral surface in intimate contact with the inner surface of the shell or frame surrounding the stator core. Since the compound engages a major portion of the end turns and is a good conductor of heat, it acts as a transition material effective in transferring heat directly to the chill ring, thereby eliminating hot spot areas that otherwise would occur in the heat transfer system. An unimpeded path for the transfer of heat from the end turns is established over substantially the complete length of the end turns for conveying heat to the stator frame which is encompassed by a heat exchanger used in dissipating heat from the machine.

The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawing in which:

Figure 1:
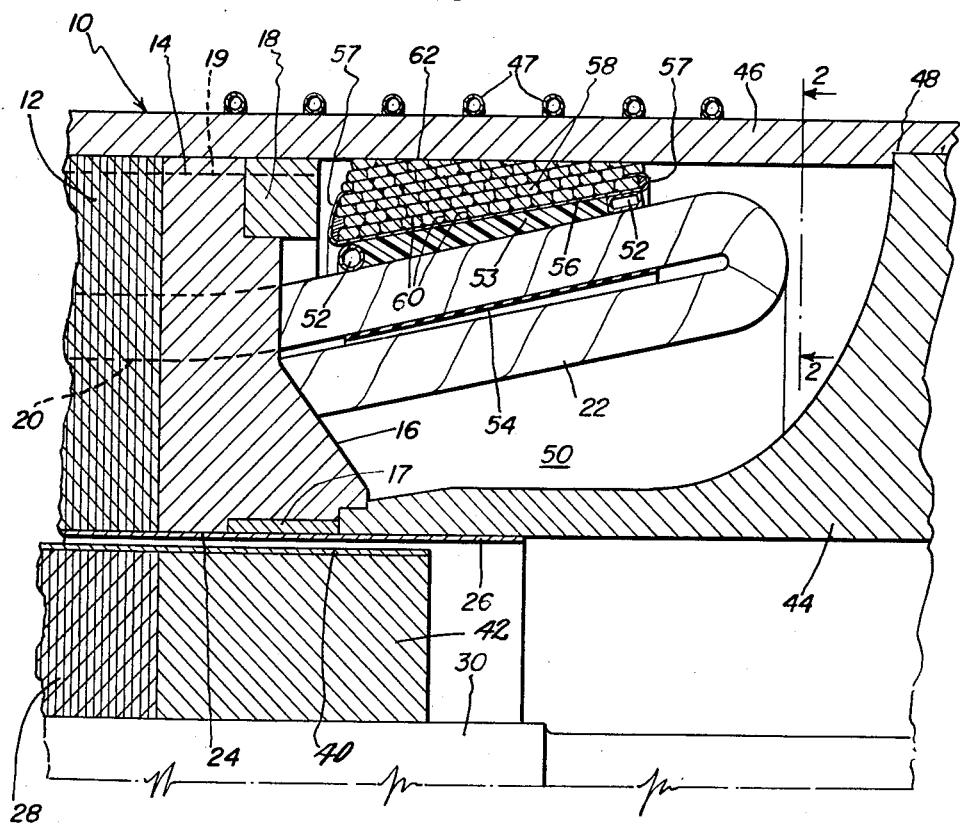
FIGURE 1 is a view in elevation, partly in section, of a portion of a typical canned motor.

Referring now to the drawing wherein like reference characters designate like or corresponding parts throughout the several views, there is shown a stator core 10 comprising a plurality of laminations 12 held in axial restraint by a cylindrical flange 14 equipped with inwardly directed fingers 16 terminating in a diameter slightly less than that of the stator bore. A back-up plate 17 is located inside the bore of the finger flange to bridge the gap between the fingers and to lend support to a portion of the cylindrical can in the stator bore. The flange 14 abuts the stator core and is held against longitudinal movement by a retaining ring 18 and building bars 19. Coils 20 having end turns 22 are positioned in slots provided in the stator core and extend outwardly between the fingers and from both ends of the machine. The particular arrangement shown illustrates a construction for a two pole machine, but it will be evident that additional machine windings may be added if desired. Conventional canned motor construction consists of a cylindrical can 24 expanded into intimate contact with the inner peripheral surface of the stator core and the can is arranged to extend a short distance beyond the end of the core proper, as indicated at 26. A squirrel cage rotor 28 equipped with fan blades and end rings, not shown, is mounted on shaft 30 and its peripheral surface is likewise equipped with a cylindrical can 40 which together with the stator can forms part of the gap for the machine. In order to provide support for the rotor can 40 in the area where the can extends beyond the rotor punchings, a shaft supported cylindrical ring 42 engages the can inner surface to provide the necessary support against radial pressures supplied by liquid circulated through the gap.

As disclosed in the copending patent applications of A. W. Brunot, entitled "Dynamoelectric Machine" and J. A. Walsh and H. C. Ward entitled "Stator Can Support," both assigned to the same assignee as the present invention, the stator can 26 is supported by a cylindrical ring 44 of trapezoidal configuration. The outer portion of the stator core is enclosed in a shell 46 having a shoulder 48 engageable by the outer surface of the trapezoidal ring 44 which closes the opening between the stator can and shell to provide a dead air space 50. As clearly indicated in FIGURE 1, the end turns 22 are positioned within this dead air space. In this type of construction, a pump, not shown, is usually attached to the rotor shaft 30 for circulating liquid in a closed external loop under a pressure of about 2,000 p.s.i. and at a temperature approximating 260° C. Since the electrical losses are relatively high, a coolant, such as water at about 80° C., is circulated between the cans forming the gap for carrying away heat from the machine. It is desirable however to have the pressure of liquid in the gap be the same as that in the pump circuit and this is accomplished by permitting the pump pressure to be reflected in the gap through openings provided in a close running shaft seal. Gross interchange between the two does not occur and a thermal barrier substantially restricts flow of heat therebetween.

Figure 2:
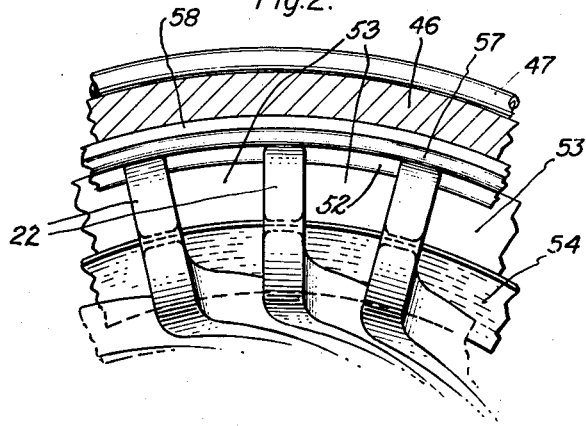
FIGURE 2 is a view taken on lines 2—2 of FIGURE 1.

Maximum dissipation of heat from the machine is requisite for obtaining optimum power output, and although some heat is transmitted from the end turns back to the stator core which is at a lower temperature, auxiliary means is preferably used for assisting in the transfer of heat to areas of lower temperature. According to the present invention, this is accomplished by locating thermal conductive elements in heat exchange relationship with the end turns and the inner surface of shell 46 so that the space therebetween is completely occupied by parts providing a low impedance path to the outward flow of heat. Preferably, a pair of cylindrical rings 52 of either circular or rectangular configuration are attached to the end turns and the axial space therebetween filled with a silicone-resin composition 53 having a filler of magnesium oxide uniformly dispersed therein. The insulating composition or potting compound 53 is initially of putty-like consistency and since it is desirable to have it in contact with a substantial portion of the end turns, a mica flake composite 54, or other insulation is positioned circumferentially in the nose of the outer coil end turns as indicated in FIGURE 2. The mica flake and rings 52 therefore form a dam of reception of the putty-like potting compound which not only confines the compound to this area but also permits it to be packed tightly around the end turns for minimizing later development of hot spots when the machine is placed in operation. Since the space between end turns is small, it is a relatively simple matter to quickly pack the compound into the space and build it up to the desired level between the spaced rings 52.

The potting compound consists of a solventless resin having a filler with a high coefficient of thermal conductivity, and a lesser amount of filler having a large surface area for controlling the final stiffness of the putty. In the preferred form, the compound includes a solventless silicone resin catalyzed with dicumyl peroxide and identified by Dow Chemical Company as No. 7521. A compound with slightly higher viscosity, No. 7501, also is acceptable. The solventless characteristic of the compound is important because it permits firm packing around the end turns. A solvented resin generally should be avoided since it is apt to leave voids in the final casting, thus resulting in poor heat transfer through the material. Silicone resins are especially suitable for use in this environment because of the necessity for stability at 250° C. In those installations where lower temperatures can be expected to prevail, such as 100° C.–125° C., other resins such as the epoxies, phenolics or polyesters, obviously could be used.

As previously indicated, the filler is magnesium oxide of high purity and is marketed by the General Electric Company under the identifying number 12700–2X. The resin requirements are such that a filler with a pH close to 7 preferably should be used. Other products having relatively high coefficients of thermal conductivity may be used, although not as successfully as magnesium oxide, and include alumina, silica flour, zirconium orthosilicate, ground mica, glass beads, sand, and the like.

The high surface area filler consists of finely divided silica and one variety is made by Monsanto Chemical Company as Santocel C, and is used effectively in controlling the stiffness of the composition.

After the compound is cured, it comprises a hard substance which is capable of having its outer surface machined to a smooth finish. A soft copper sheet 56 is then applied over the smooth surface and a chill ring 58 comprising a plurality of layers of rectangular shaped copper wire is wound on the soft copper sheet. Each turn of the wire is welded or soldered at 60 to the next turn and each layer of wire likewise is welded to the layer therebeneath to form a substantially solid mass of copper. The ends 57 of the copper sheet are bent over during assembly of the chill ring as shown. Subsequently the outer surface 62 is planed to the same diameter as the inner periphery of shell 46 so that when the stator core 10, including the heat exchange elements 53, 56 and 58, are assembled in the shell 46, the outer surface of the chill ring is placed in intimate contact with the shell inner periphery.

The iron of the stator core in a motor not equipped with a chill ring, constitutes a heat sink to which heat is transferred by those portions of the coils within the core slots, and although some heat from the end turns flows axially to the core, the rate of heat dissipation is not great and this factor determines to a large extent the power rating of the motor. The construction described above utilizes a transition material in the form of resinous compound capable of firmly adhering to the end turn insulation and having a filler displaying heat conductive properties for effecting the transfer of heat from the end turns through the metallic parts to the shell 46. Heat generated in the end turns is therefore conducted unimpeded through a parallel or supplemental path to the area of lower temperature. This effectively reduces the end turn temperature to a level substantially the same as that prevailing in the core and the practical and ultimate result is that the motor can be operated at an overall higher current rating with the same maximum temperature. The power output of the motor is therefore increased thus permitting the application of a higher rating to the machine. In one motor, prior to development of even better techniques of manufacture, the rating was changed from 280 H.P. to 310 H.P. because of the effectiveness of the chill ring in dissipating heat from the end turns.

An important factor contributing to the integrity of this heat transfer system is that the filler dispersed in the resinous composition is an excellent conductor of heat but a very poor conductor of electric current. The possibility of establishing creepage paths or short circuits between the coils and the metallic chill ring is reduced to such a great extent that the possibility of their establishment is almost non-existent.

This construction effectively transfers heat from the end turns without having to especially fit a heat exchange element between the irregular surfaces of the end turns and the chill ring, while still protecting the coil insulation from the effects of thermal cycling and mechanical stress. Of equal importance is the fact that an area inside the end turns is accessible to an operator for facilitating removal of the resinous composition for coil repair or replacement.

The desired characteristics for the potting compound 53 is that it should be of putty-like consistency, preferably on the sticky side, to permit its insertion between the coil end turns and on the outer portions thereof during installation. It should have good heat transfer properties and be stable in the neighborhood of 250° C., be inert and thermosetting, stable under radiation and long term heating, and capable of displaying desirable electrical insulation properties. The cured compound must be sufficiently strong so as to minimize cracking under thermal cycling and mechanical stresses.

It will be evident that the soft copper sheet could be eliminated and the rectangular wire directly applied to the exposed surface of the potting compound.

The sheet appears to provide better heat conductivity because it conforms more closely to the inner layer of copper wires, but since both the smooth surface of compound and the wire would be in full heat exchange relationship, acceptable dissipation of heat would be accomplished.

Alternatively, in lieu of providing a chill ring comprising a plurality of turns of copper wire, a solid or split ring of copper, iron, or other metallic composition having the same or equivalent degree of heat conductivity may serve as a substitute. Where desired, the ring obviously could be applied in segments to the exposed portion of the soft copper sheet or directly to the potting compound. Some installations lend themselves to a build-up of the chill ring by spraying copper, aluminum or other metal directly on the potting compound or on the copper sheet. We have found that acceptable chill rings can be made in this manner.

Although the heat exchanger 47 is located outside of the shell, it is evident that it could be embedded in the chill ring and designed to extend either axially or longitudinally thereof. It may also be embedded in the potting compound if desired.

The mica flake has been illustrated as being applied in the nose of the end turns. In practice, the mica is positioned in the most convenient area consistent with providing a dam for the potting compound. In machines having two sets of coils per slot used for obtaining two and four pole operation, the mica then should be positioned between the inner and outer end turns. In some cases, it may even be desirable to also position it in the nose of the end turns. The exact position is not important so long as a dam can be established which will permit close adherence of the potting compound to the body of the coil end turns.

It will be apparent that many modifications and variations are possible in light of the above teachings. The principal concept disclosed herein is that of providing a transition compound of high heat conductivity between the end turns and a chill ring for transferring heat from the end turns directly to a shell surrounding these parts and which is in direct communication with a heat exchanger. It therefore is to be understood that within the scope of the appended claims, the invention may be practiced otherwise than as specifically described.

What we claim as new and desire to secure by Letters Patent of the United States is:

1. Apparatus for transmitting heat from coils in a confined space to an area of lower temperature comprising a magnetic core having electrical conductors therein, a portion of said conductors extending outwardly from said core and enclosed in a dead air space, an initially soft heat conductive material of putty-like consistency capable of curing into a solid substance positioned on a major portion of the axial length of said portions of the conductors, and a metallic body having its inner surface in contact with the heat conductive material and its outer surface in engagement with a member encompassing said core of lower temperature for facilitating transfer of heat from the end turns to the latter by conduction.

2. Apparatus for transmitting heat from the end turns of a dynamoelectric machine comprising a core having coils therein, cylindrical members respectively positioned on the inner and outer surfaces of the core and extending axially therefrom and equipped with a ring closing their ends opposite from the core to provide a dead air space therebetween, coil end turns positioned in the dead air space, an initially soft heat conducting material applied to a major portion of the outer surfaces of the end turns and cured to a rigid heat conductive mass, and a chill ring comprising a metallic body extending substantially the complete length of said end turns and having its inner surface placed in contact with the outer surface of the heat conducting material, and the outer peripheral surface of the ring in full surface contact with the outer member extending from the core, whereby heat generated in the end turns is transmitted unimpeded therefrom to the outer member on the core.

3. Apparatus for transmitting heat from end turns of a canned motor comprising a stator core enclosed in a shell and having a cylindrical can on its inner peripheral surface, a dead air space formed by the extensions of said can and shell axially from the core and closed by a cylindrical closure ring, coils in said stator having end turns projecting outwardly into said dead air space, and a flange in contact with the stator laminations for providing axial restraint to the stator laminations and having inwardly directed fingers for spacing and positioning the end turns, a heat conductive material placed in intimate contact with a major portion of the end turns and having a sheet of metallic material placed on its outer surface, and a chill ring comprising a plurality of layers of wire having the inner surface thereof in contact with the metallic material and its outer surface in engagement with the inner peripheral surface of the shell extension on the stator, whereby heat is transferred unimpeded from the end turns through the heat conductive material and chill ring to said shell which is at a lower temperature.

4. Apparatus for transmitting heat from end turns of a canned motor comprising a stator core enclosed in a shell and having a cylindrical can on its inner peripheral surface, a dead air space formed by the extensions of said can and shell axially from the core and closed by a cylindrical closure ring, coils in said stator having end turns projecting outwardly into said dead air space, and a flange in contact with the stator laminations for providing axial restraint to the stator laminations and having inwardly directed fingers for spacing and positioning the end turns, a heat conductive material in engagement with the major portion of the end turns, said material comprising a resin having a heat conductive filler uniformly dispersed therein, means confining said heat conducting material to a predetermined portion of the length of said end turns, and a chill ring comprising a member of high thermal conductivity placed in contact with said material and having its outer surface in engagement with said shell for transmitting heat from the end turns unimpeded to said shell.

5. Apparatus for transmitting heat from end turns of a canned motor comprising a stator core enclosed in a shell and having a cylindrical can on its inner peripheral surface, a dead air space formed by the extensions of said can and shell axially from the core and closed by a cylindrical closure ring, coils in said stator having end turns projecting outwardly into said dead air space, and a flange in contact with the stator laminations for providing axial restraint to the stator laminations and having inwardly directed fingers for spacing and positioning the end turns, a pair of spaced tubes on the peripheral portion of said end turns, a heat conductive material extending the distance between said tubes and in engagement with a substantial portion of said end turns, said material comprising a thermosetting resin having a filler of magnesium oxide, a heat conductive member disposed on its outer peripheral surface to provide a smooth area for reception of a chill ring which has its outer surface in contact with said shell for dissipating heat unimpeded from the end turns to said shell.

References Cited in the file of this patent

UNITED STATES PATENTS

| | | |
|---|---|---|
| 886,561 | Waters | May 5, 1908 |
| 996,270 | Mattman | June 27, 1911 |
| 1,238,280 | Field | Apr. 28, 1917 |
| 2,824,983 | Cametti | Feb. 25, 1958 |
| 2,887,062 | Cametti | May 19, 1959 |
| 2,944,297 | Maynard | July 12, 1960 |

OTHER REFERENCES

Railway Locomotives and Cars, vol. 129, No. 7, July 1955, p. 56.